V. ROYLE.
TAKE-UP OR TENSION MECHANISM.
APPLICATION FILED SEPT. 17, 1914.
1,167,843.
Patented Jan. 11, 1916.
2 SHEETS—SHEET 1.
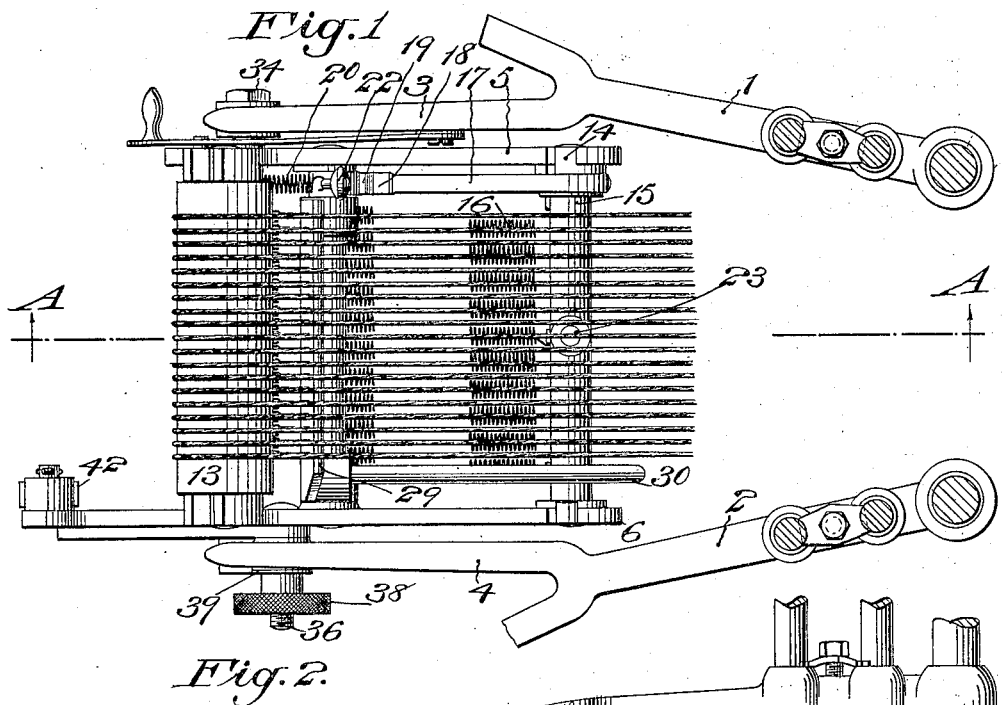
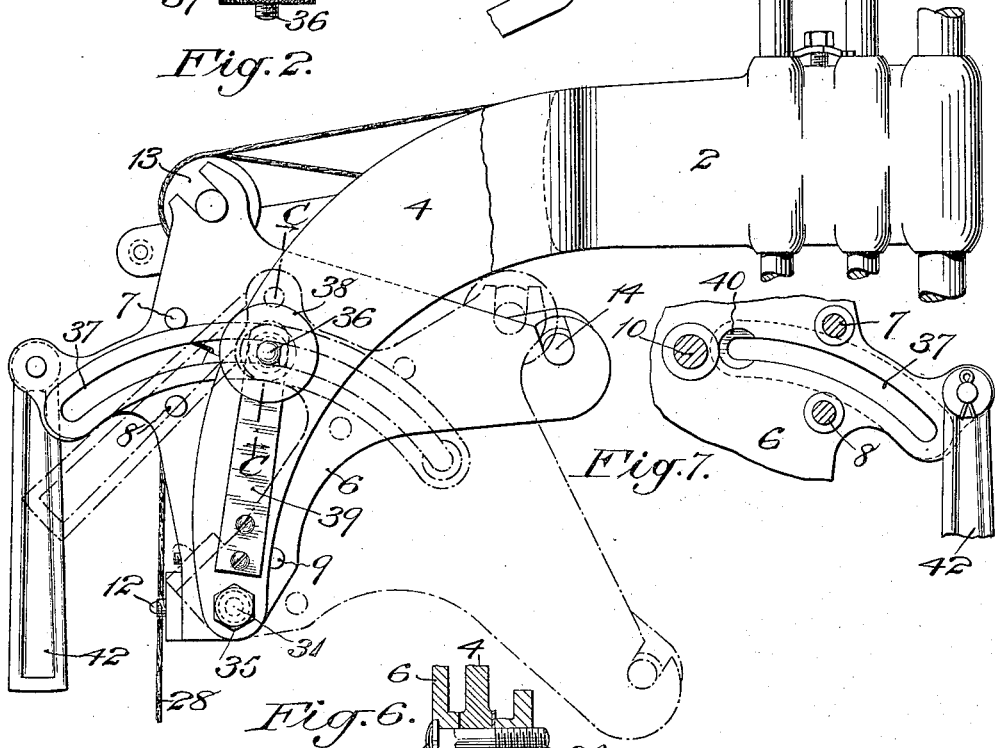
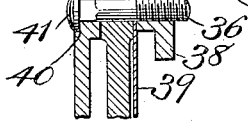
Witnesses:—
Hyperion Barry.
F. George Barry.
Inventor:—
Vernon Royle
By Brown & Edward
his Attorneys

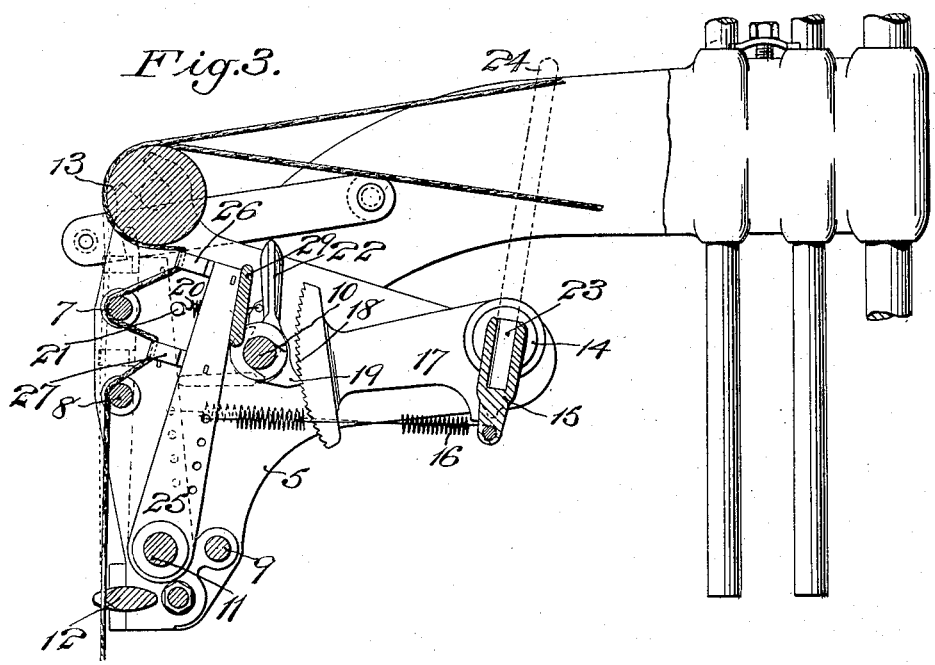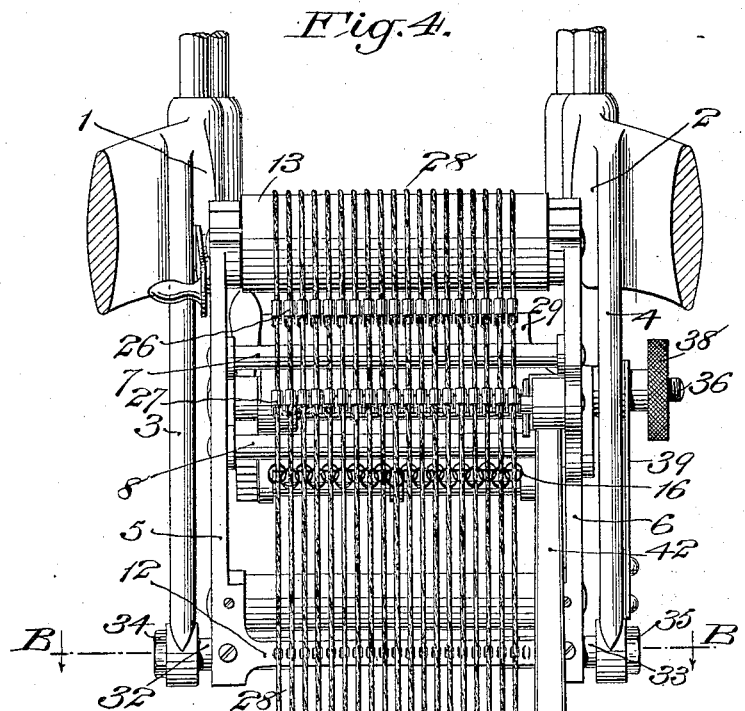

UNITED STATES PATENT OFFICE.

VERNON ROYLE, OF PATERSON, NEW JERSEY.

TAKE-UP OR TENSION MECHANISM.

1,167,843.   Specification of Letters Patent.   Patented Jan. 11, 1916.

Application filed September 17, 1914. Serial No. 862,213.

*To all whom it may concern:*

Be it known that I, VERNON ROYLE, a citizen of the United States, and resident of Paterson, in the county of Passaic and State of New Jersey, have invented a new and useful Improvement in Take-Up or Tension Mechanisms, of which the following is a specification.

My invention relates to take-up or tension mechanism, with the object in view of providing an efficient mechanism for use either singly or as one of several units wherever slack is taken up or tension applied to one or more threads.

I have chosen to illustrate my invention as a mechanism suitable for forming one of several units for taking up slack and applying tension to the warp threads of a circular loom, but I do not wish to confine myself to this particular use as the mechanism is capable of a far more general use.

In the accompanying drawings, Figure 1 is a top plan view of the mechanism, Fig. 2 is a view in side elevation, Fig. 3 is a vertical section in the plane of the line A—A of Fig. 1. Fig. 4 is a front elevation. Fig. 5 is a section in the plane of the line B—B of Fig. 4, Fig. 6 is a section in the plane of the line C—C of Fig. 2, and Fig. 7 is a reverse view of a portion of the frame of the mechanism shown in Fig. 2.

Supporting brackets 1 and 2 are provided with arms 3, 4, between which a unit of the take-up or tension mechanism is located.

The frame of the take-up or tension mechanism conveniently consists of two end plates 5, 6, connected by tie rods 7, 8, 9, to fixed shafts 10 and 11 and a toothed guide plate 12. A thread guide roller 13 is mounted in suitable bearings at the upper ends of the plates and a rock shaft 14 is mounted at the rear portion of the ends and has fixed thereto a depending plate 15, to the lower portion of which a series of tension springs 16 are attached. A frame 17 is also attached to the rock shaft 14 near one end thereof and carries a ratchet toothed segment 18 in position to be engaged by a pawl 19 mounted to rock on the fixed shaft 10, and held normally in engagement with the ratchet toothed segment 18 by a spring 20, one end of which is attached to a stud 21 on the end frame 5 and the opposite end to the pawl handle 22. The plate 15 to which the tension springs are attached, is provided with a socket 23 for the reception of a removable hand lever indicated by dotted lines 24, see Fig. 3, for rocking the plate and hence the ratchet toothed segment 18, to increase or diminish the tension of the springs 16, as will hereinafter appear.

For each thread there is a thread guide arm 25 pivoted on the shaft 11 and provided, in the present instance, with two thread eyes 26, 27, the former in position to receive a thread 28 intermediate of the roller 13 and the tie-rod 7, and the latter to engage the thread between the tie-rods 7 and 8. The tie-rods 7 and 8 serve not only their function as tie-rods, but also as smooth surfaced guides over which the thread 28 passes. Each arm 25 has attached to it one of the tension springs 16, tending to draw it rearwardly and hence cause the thread to take a zig-zag course in passing over the tie-rods 7, 8, and roller 13 and through the eyes 26, 27. As strain upon the thread 28 tends to draw the arm 25 toward an upright position and thereby allow the thread to pass more freely through the eyes 26, 27 and over the tie-rods and roller, it follows that the greater the tension upon the springs 16, the greater will be the resistance to the forward movement of the arm 25 and hence the greater the tension exerted upon the thread. The degree of tension may be maintained with great accuracy for any given size or quality of thread by rocking the toothed segment 18 in a direction to carry the lower end of the plate 15 away from or toward the arm 25. If it be desired to increase the tension, the plate 15 may be rocked in a direction to swing its lower edge away from the arm 15, the pawl 19 riding over the teeth and assuming a locking position in a succeeding tooth. If, however, it is desired to lessen the tension, the pawl 19 may be manipulated by the handle 22 to release it from the segment 18, and the plate 15 may be allowed to swing to bring its lower edge nearer to the arm 25.

For convenience in threading, provision is made for swinging all the arms 25 forwardly against the tension of their springs 16, as follows: On the shaft 10 there is journaled a plate 29 which normally forms a back stop for the arms 25 but which may be rocked by means of a lever 30, see Fig. 1, into the position shown in dotted lines Fig. 3, thereby simultaneously forcing all of the arms 25 forward into the position shown in dotted lines in Fig. 3, with their thread eyes in alinement with the tie-rods 7, 8, and front face of the roller 13. After the threading is completed, the plate may be thrown back into the position shown in full lines Fig. 3, leaving the arms 25 free to oscillate under the tension of the thread.

The mechanism as a whole may be swung inwardly in the position shown in dotted lines in Fig. 2, leaving the threads slack and free to be manipulated without drawing them from the supply roll. This is provided for as follows. A spacing shaft 31 is provided with screw threaded portions at its opposite ends on which sleeve nuts 32, 33 are screwed. These sleeve nuts 32, 33 form fulcrums for the ends 5 and 6 of the take-up or tension mechanism frame and also pass through the arms 3 and 4 of the supporting bracket and are provided with heads 34, 35, for drawing the ends of the arms 3 and 4 together into the desired proximity to the ends of the tension mechanism frame. This determining of the spread of the arms 3 and 4 is particularly important in the case of a circular loom where a complete circuit of these mechanisms is employed so that there shall be no crowding at any particular point in the circuit.

The take-up or tension unit is locked to and released from an arm of the supporting bracket by means of a bolt 36 passing through the arm 4 and also through an elongated curved slot 37 in the end 6. The bolt 36 is provided with a thumb nut 38 which works against a flat spring 39 interposed between the nut and the face of the arm 4. The end plate 6 is further provided at one end of the slot 37, namely, that end at which the bolt is located when the take-up or tension mechanism is in its operative position, with a shallow recess 40 for receiving the head 41 of the bolt, thereby securely locking the mechanism in its operative position until the nut 38 has been slackened sufficiently to allow the bolt 36 to be moved endwise to free its head from the recess 40. A handle 42 is provided for conveniently swinging the unit take-up or tension mechanism in and out, and jam nuts 43, 44 are provided on the spacing bar 31 to lock the sleeve nuts 32, 33 against liability to unintentional turning.

What I claim is:

1. A suitable support, a take-up or tension mechanism comprising a bank of independently acting spring-actuated arms, the said bank being pivoted to swing bodily in said support and means for locking the mechanism in its operative swung position.

2. A suitable support, a take-up or tension mechanism comprising a bank of independently acting, spring-actuated arms, the said bank being pivoted to swing bodily in said support and a spring-actuated bolt for locking the mechanism in its operative swung position.

3. A take-up or tension mechanism comprising independent spring-actuated tension arms, one for each thread, and means for simultaneously forcing the said arms into inactive position against the action of their springs.

4. A take-up or tension mechanism comprising independent spring-actuated tension arms and a lever manipulated device for forcing the tension arms simultaneously into inactive position against the action of their springs.

5. A take-up or tension device comprising a bank of independent spring-actuated tension arms and means for forcing the arms simultaneously into inactive position, in combination with a support in which the said bank of arms and forcing means are mounted to swing together.

6. A suitable support, a take-up or tension mechanism pivoted to swing bodily in said support, the support and the take-up or tension mechanism being provided, the one with a curved slot and the other with a bolt in position to pass through the slot, the element provided with the curved slot being further provided with a recess to receive the head of the bolt to secure the pivoted mechanism in operative position.

7. In combination, supporting arms, a take-up or tension mechanism including end frames and a tie bolt on which said ends are pivoted, said tie bolt being extensible and collapsible for spacing said supporting arms.

8. In combination, supporting arms, a take-up or tension mechanism including end frames and a tie bolt provided with sleeve nuts on its ends engaged with said supporting arms, the said sleeve nuts forming bearings for the end frames of the take-up or tension mechanism.

In testimony, that I claim the foregoing as my invention, I have signed my name in presence of two witnesses, this ninth day of September, 1914.

VERNON ROYLE.

Witnesses:
HEBER ROYLE,
F. J. BRADLEY.